(12) United States Patent
Li et al.

(10) Patent No.: US 12,136,261 B2
(45) Date of Patent: Nov. 5, 2024

(54) COUNTERFACTUAL CONTEXT-AWARE TEXTURE LEARNING FOR CAMOUFLAGED OBJECT DETECTION

(71) Applicant: National University of Defense Technology, Hunan (CN)

(72) Inventors: Shuohao Li, Hunan (CN); Xiaofei Li, Hunan (CN); Jun Zhang, Hunan (CN); Kuihua Huang, Hunan (CN); Chao Chen, Hunan (CN); Boliang Sun, Hunan (CN); Jun Lei, Hunan (CN); Miaomiao Yu, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/644,727

(22) Filed: Apr. 24, 2024

(65) Prior Publication Data

US 2024/0312194 A1   Sep. 19, 2024

Related U.S. Application Data

(63) Continuation of application No. PCT/CN2023/081035, filed on Mar. 13, 2023.

(51) Int. Cl.
*G06V 10/80* (2022.01)
*G06V 10/54* (2022.01)
(Continued)

(52) U.S. Cl.
CPC ........... *G06V 10/806* (2022.01); *G06V 10/54* (2022.01); *G06V 10/768* (2022.01); *G06V 10/7715* (2022.01)

(58) Field of Classification Search
CPC .... G06V 10/806; G06V 10/54; G06V 10/768; G06V 10/7715
See application file for complete search history.

(56) References Cited

FOREIGN PATENT DOCUMENTS

| CN | 114581703 A | | 6/2022 |
|---|---|---|---|
| CN | 114581752 A | * | 6/2022 |
| CN | 114724008 A | | 7/2022 |

OTHER PUBLICATIONS

Fan et al, Camouflaged Object Detection, 2020, Computer Vision Foundation, pp. 2777-2787 (Year: 2020).*

(Continued)

*Primary Examiner* — Aaron W Carter
*Assistant Examiner* — Kathleen M Broughton

(57) ABSTRACT

A counterfactual context-aware texture learning network system, including: a camera configured to capture an input image; a processor configured to perform camouflaged object detection on the input image; and a memory configured to store a texture-aware refinement module (TRM), a context-aware fused module (CFM), and a counterfactual intervention module (CIM); wherein the processor is configured to execute program instructions of the TRM, the CFM, and the CIM; the TRM is configured to extract dimension features from the input image; the CFM is configured to infuse multi-scale contextual features; the CIM is configured to identify a camouflaged object with counterfactual intervention via the processor; the TRM includes: a receptive field block (RFB) configured to expand a receptive field and extract texture features; and a position attention module (PAM) and a channel attention module (CAM) configured to further refine texture-aware features and obtain discriminant feature representation.

12 Claims, 9 Drawing Sheets

(51) Int. Cl.
G06V 10/70 (2022.01)
G06V 10/77 (2022.01)

(56) References Cited

OTHER PUBLICATIONS

Li et al, Camouflaged object detection with counterfactual intervention, Neurocomputing, 2023, 553 (2023): pp. 1-13. (Year: 2023).*
Martin Stevens and Sami Merilaita. Animal camouflage: current issues and new perspectivese. Philosophical Transactions of the Royal Socity B, 2009. 1.
Yujia Sun, Geng Chen, Tao Zhou, Yi Zhang, and Nian Liu. Context-aware cross-level fusion network for camouflaged object detection. IJCAI, 2021. 3, 6, 8.
Zhongqi Yue Hanwang Zhang Qianru Sun and Xiansheng Hua. Interventional few-shot learning. 2020. 3.
Kaihua Tang, Jianqiang Huang, and Hanwang Zhang. Long-tailed classification by keeping the good and removing the bad momentum causal effect. 2020. 3.
Kaihua Tang, Yulei Niu, Jianqiang Huang, Jiaxin Shi, and Hanwang Zhang. Unbiased scene graph generation from biased training. In CVPR, 2020. 3.
Tyler J VanderWeele. A three-way decomposition of a total effect into direct, indirect, and interactive effects. Epidemiology (Cambridge, Mass.), 24(2):224, 2013. 6.
Tyler J VanderWeele. Explanation in causal inference: methods for mediation and interaction, 2015. Oxford University Press. 5, 6.
Tan Wang, Jianqiang Huang, Hanwang Zhang, and Qianru Sun. Visual commonsense r-cnn. In CVPR, 2020. 3.
Jun Wei, Shuhui Wang, and Qingming Huang. F3net: Fusion, feedback and focus for salient object detection. In AAAI, 2020. 6.
Zach Wood-Doughty, Ilya Shpitser, and Mark Dredze. Challenges of using text classifiers for causal inference. EMNLP, 2018:4586, 2018. 3.
Zhe Wu, Li Su, and Qingming Huang. Cascaded partial decoder for fast and accurate salient object detection. In CVPR, 2019. 3.
Xin Yang, Haiyang Mei, Ke Xu, Xiaopeng Wei, Baocai Yin, and RynsonW.H. Lau. Where is my mirror? In ICCV, 2019. 3, 4.
Zhongqi Yue, Tan Wang, Qianru Sun, Xian-Sheng Hua, and Hanwang Zhang. Counterfactual zero-shot and open-set visual recognition. In CVPR, 2021. 3.
Qiang Zhai, Xin Li, Fan Yang, Chenglizhao Chen, Hong Cheng, and Deng-Ping Fan. Mutual graph learning for camouflaged object detection. In CVPR, 2021. 6, 8.
Dong Zhang, Hanwang Zhang, Jinhui Tang, Xiansheng Hua, and Qianru Sun. Causal intervention for weakly-supervised semantic segmentation. 2020. 3.
Lu Zhang, Ju Dai, Huchuan Lu, You He, and Gang Wang. A bi-directional message passing model for salient object detection. In CVPR, 2018. 2.
Hengshuang Zhao, Jianping Shi, Xiaojuan Qi, Xiaogang Wang, and Jiaya Jia. Pyramid scene parsing network. In CVPR, 2017. 6, 8.
Jia-Xing Zhao, Jiang-Jiang Liu, Deng-Ping Fan, Yang Cao, Jufeng Yang, and Ming-Ming Cheng. Egnet: Edge guidance network for salient object detection. In ICCV, 2019. 6, 8.
Ting Zhao and Xiangqian Wu. Pyramid feature attention network for saliency detection. In CVPR, 2019. 6, 8.
Liu, Songtao et al. "Receptive Field Block Net for Accurate and Fast Object Detection" Proceedings of the European Conference on Computer Vision(ECCV), Dec. 31, 2018.
Zongwei Zhou and Mahfuzur Rahman Siddiquee, Nima Tajbakhsh, and Jianming Liang. Unet++: A nested u-net architecture for medical image segmentation. In DLMIA, 2018. 6, 8.
Roy R Behrens. Seeing through camouflage: Abbott Thayer, background-picturing and the use of cutout silhouettes. Leonardo, 51(1):40-46, 2018. 2.
Nagappa U. Bhajantri and P. Nagabhushan. Camouflage defect identification: a novel approach. In In International Conference on Information Technology, 2006. 2.
Kai Chen, Jiangmiao Pang, Jiaqi Wang, Yu Xiong, Xiaoxiao Li, Shuyang Sun, Wansen Feng, Ziwei Liu, Jianping Shi, Wanli Ouyang, and et al. Hybrid task cascade for instance segmentation. In CVPR, 2019. 6, 8.
Liang-Chieh Chen, George Papandreou, Iasonas Kokkinos, Kevin Murphy, and Alan L Yuille. Deeplab: Semantic image segmentation with deep convolutional nets, Atrous convolution, and fully-connected crfs. IEEE TPAMI, 40(4):834-848, 2018. 2.
Zuyao Chen, Qianqian Xu, Runmin Cong, and Qingming Huang. Global context-aware progressive aggregation network for salient object detection. In AAAI, 2020. 2, 4.
Hung-Kuo Chu, Wei-Hsin Hsu, Niloy J. Mitra, Daniel Cohen-Or, Tien-TsinWong, and Tong-Yee Lee. Camouflage images. ACM Trans. Graph., 29(4):51-1, 2010. 1.
IC Cuthill. Camouflage. Journal of Zoology, 308(2):75-92, 2019. 2.
Yimian Dai, Fabian Gieseke, Stefan Oehmcke, Yiquan Wu, and Kobus Barnard. Attentional feature fusion. In WACV, 2020. 4.
Henghui Ding, Xudong Jiang, Bing Shuai, Ai Qun Liu, and Gang Wang. Context contrasted feature and gated multi-scale aggregation for scene segmentation. In CVPR, 2018. 3.
Deng-Ping Fan, Ming-Ming Cheng, Yun Liu, Tao Li, and Ali Borji. Structure-measure: A new way to evaluate foreground maps. In ICCV, 2017. 6.
Deng-Ping Fan, Ge-Peng Ji, Ming-Ming Cheng, and Ling Shao. Concealed object detection. IEEE TPAMI, 66(12):9909-9917, 2021. 6, 8.
Deng-Ping Fan, Ge-Peng Ji, Xuebin Qin, and Ming-Ming Cheng. Cognitive vision inspired object segmentation metric and loss function. In Scientia Sinica Informationis, 2021. 6.
Deng-Ping Fan, Ge-Peng Ji, Guolei Sun, Ming-Ming Cheng, Jianbing Shen, and Ling Shao. Camouflaged object detection. In CVPR, 2020. 2, 6, 8.
Deng-Ping Fan, Tao Zhou, Ge-Peng Ji, Yi Zhou, Geng Chen, Huazhu Fu, Jianbing Shen, and Ling Shao. Inf-net: Automatic covid-19 lung infection segmentation from ct images. 2020. 1.
Jun Fu, Jing Liu, Haijie Tian, Yong Li, Yongjun Bao, Zhiwei Fang, and Hanqing Lu. Dual attention network for scene segmentation. In CVPR, 2019. 3.
Shanghua Gao, Ming-Ming Cheng, Kai Zhao, Xin-Yu Zhang, Ming-Hsuan Yang, and Philip Torr. Res2net: A new multi-scale backbone architecture. IEEE TPAMI, 2019.
Shiming Ge, Xin Jin, Qiting Ye, Zhao Luo, and Qiang Li. Image editing by object-aware optimal boundary searching and mixed-domain composition. Computational Visual Media, 4(1):71-82, 2018. 1.
York Hagmayer, Steven A Sloman, David A Lagnado, and Michael R Waldmann. Causal reasoning through intervention. Causal learning: Psychology, philosophy, and computation, 2007. 5.
Joanna R Hall, Innes C Cuthill, Roland J Baddeley, Adam J Shohet, and Nicholas E Scott-Samuel. Camouflage, detection and identification of moving targets. In Proceedings of The Royal Society B: Biological Sciences, 2013. 3.
Kaiming He, Georgia Gkioxari, Piotr Doll'ar, and Ross Girshick. Mask r-cnn. In ICCV, 2017. 6, 8.
Qibin Hou, Daquan Zhou, and Jiashi Feng. Coordinate attention for efficient mobile network design. In CVPR, 2021. 4.
Zilong Huang, Xinggang Wang, Lichao Huang, Chang Huang, Yunchao Wei, and Wenyu Liu. Ccnet: Criss-cross attention for semantic segmentation. In ICCV, 2019. 3, 4.
Nathan Kallus and Angela Zhou. Confounding-robust policy improvement. 2018. 3.
Murat Kocaoglu, Christopher Snyder, Alexandros G Dimakis, and Sriram Vishwanath. Causalgan: Learning causal implicit generative models with adversarial training, 2017. arXiv preprint arXiv:1709.02023. 3.
Trung-Nghia Le, Tam V. Nguyen, Zhongliang Nie, Minh-Triet Tran, and Akihiro Sugimoto. Anabranch network for camouflaged object segmentation. 2019. 1, 2, 6, 8.
Tsung-Yi Lin, Piotr Doll'ar, Ross Girshick, Kaiming He adn Bharath Hariharan, and Serge Belongie. Feature pyramid networks for object detection. In CVPR, 2017. 6, 8.

(56) References Cited

OTHER PUBLICATIONS

Nian Liu, Junwei Han, and Ming-Hsuan Yang. Picanet: Learning pixel-wise contextual attention for saliency detection. In CVPR, 2018. 6, 8.

David Lopez-Paz, Robert Nishihara, Soumith Chintala, Bernhard Scholkopf, and L'eon Bottou. Discovering causal signals in images. In CVPR, 2017. 3.

Yunqiu Lv, Jing Zhang, Yuchao Dai, Aixuan Li, Bowen Liu, Nick Barnes, and Deng-Ping Fan. Simultaneously localize, segment and rank the camouflaged objects. In CVPR, 2021. 6, 8.

Ran Margolin, Lihi Zelnik-Manor, and Ayellet Tal. How to evaluate foreground maps? In CVPR, 2014. 6, 7.

Haiyang Mei, Ge-Peng Ji, Ziqi Wei, Xin Yang, Xiaopeng Wei, and Deng-Ping Fan. Camouflaged object segmentation with distraction mining. In CVPR, 2021. 6, 8.

Haiyang Mei, Xin Yang, Yang Wang, Yuanyuan Liu, Shengfeng He, Qiang Zhang, Xiaopeng Wei, and Rynson W.H. Lau. Don't hit me! glass detection in real-world scenes. In CVPR, 2020. 2, 4.

Ajoy Mondal. Camouflaged object detection and tracking: A survey. In IJIG, 2020. 2.

Iv'an Huerta Daniel Rowe Mikhail Mozerov and Jordi Gonzalez. Improving background subtraction based on a casuistry of colour-motion segmentation problems. In In Iberian Conference on Pattern Recognition and Image Analysis, 2007. 2.

Yulei Niu, Kaihua Tang, Hanwang Zhang, Zhiwu Lu, Xian-Sheng Hua, and Ji-Rong Wen. Counterfactual vqa: A causeeffect look at language bias. In CVPR, 2021. 3.

Youwei Pang, Xiaoqi Zhao, Lihe Zhang, and Huchuan Lu. Multi-scale interactive network for salient object detection. In CVPR, 2020. 6, 8.

Adam Paszke, Sam Gross, Francisco Massa, Adam Lerer, James Bradbury, Gregory Chanan, Trevor Killeen, Zeming Lin, Natalia Gimelshein, Luca Antiga, and et al. Pytorch: An imperative style, high-performance deep learning library. 2019. 7.

Judea Pearl. Causality: Models, reasoning and inference. Springer, 2000. 5.

Judea Pearl. Direct and indirect effects. arXiv preprint arXiv:1301.2300, 2013. 5.

Judea Pearl, Madelyn Glymour, and Nicholas P Jewel. Causal inference in statistics: A primer. 2016. 3.

Judea Pearl and Dana Mackenzie. The book of why: The new science of cause and effect. Basic Books, 2018. 2.

Jiaxin Qi, Yulei Niu, Jianqiang Huang, and Hanwang Zhang. Two causal principles for improving visual dialog. In CVPR, 2020. 3.

Xuebin Qin, Zichen Zhang, Chenyang Huang, Chao Gao, Masood Dehghan, and Martin Jagersand. Basnet: Boundary-aware salient object detection. In CVPR, 2019. 6, 8.

Ch Kavitha B Prabhakara Rao and A. Govardhan. An efficient content based image retrieval using color and texture of image sub-blocks. International Journal of Engineering Science and Technology, 3(2):1060-1068, 2011. 2.

Pranet: Parallel reverse attention network for polyp segmentation. Deng-ping fan and ge-peng ji and tao zhou and geng chen and huazhu fu and jianbing shen and and ling shao. In MICCAI, 2020. 1.

Donald B Rubin. Essential concepts of causal inference: a remarkable history and an intriguing future. Biostatistics & Epidemiology, 3(1):140-155, 2019. 3.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, and et al. Imagenet large scale visual recognition challenge. International journal of computer vision, 115(3):211-252, 2015. 7.

C. Dhawale S. Singh and S. Misra. Survey of object detection methods in camouflaged image. Journal of IERI Procedia, 4(1):351-357, 2003. 1.

Punnarai Siricharoen, Supavadee Aramvith, Thanarat H. Chalidabhongse, and Supakorn Siddhichai. Robust outdoor human segmentation based on color-based statistical approach and edge combination. In In International Conference on Green Circuits and Systems, 2010. 2.

\* cited by examiner

| Methods \ xds | Pub.'Year | CHAMELEON (76 images) | | | CAMO-Test (250 images) | | | | COD10K-Test (2,026 images) | | | |
|---|---|---|---|---|---|---|---|---|---|---|---|---|
| | | $S_\alpha\uparrow$ | $E_\phi\uparrow$ | $F_\beta\uparrow$ | $M\downarrow$ | $S_\alpha\uparrow$ | $E_\phi\uparrow$ | $F_\beta\uparrow$ | $M\downarrow$ | $S_\alpha\uparrow$ | $E_\phi\uparrow$ | $F_\beta\uparrow$ | $M\downarrow$ |
| FPN [29] | CVPR'17 | 0.794 | 0.835 | 0.590 | 0.075 | 0.684 | 0.791 | 0.483 | 0.131 | 0.697 | 0.711 | 0.411 | 0.075 |
| PSPNet [72] | CVPR'17 | 0.773 | 0.814 | 0.555 | 0.085 | 0.663 | 0.778 | 0.455 | 0.139 | 0.678 | 0.688 | 0.377 | 0.080 |
| UNet++ [1] | CVPR'18 | 0.695 | 0.762 | 0.501 | 0.094 | 0.599 | 0.653 | 0.392 | 0.149 | 0.623 | 0.672 | 0.350 | 0.086 |
| PiCANet [30] | CVPR'18 | 0.769 | 0.749 | 0.536 | 0.085 | 0.609 | 0.584 | 0.356 | 0.156 | 0.649 | 0.643 | 0.322 | 0.090 |
| MSRCNN [23] | CVPR'19 | 0.637 | 0.686 | 0.443 | 0.091 | 0.617 | 0.669 | 0.454 | 0.133 | 0.641 | 0.706 | 0.419 | 0.073 |
| BASNet [46] | CVPR'19 | 0.687 | 0.721 | 0.474 | 0.118 | 0.618 | 0.661 | 0.413 | 0.159 | 0.634 | 0.678 | 0.365 | 0.105 |
| PFANet [74] | CVPR'19 | 0.679 | 0.648 | 0.378 | 0.144 | 0.659 | 0.622 | 0.622 | 0.172 | 0.636 | 0.618 | 0.286 | 0.128 |
| HTC [4] | CVPR'19 | 0.517 | 0.490 | 0.204 | 0.129 | 0.476 | 0.442 | 0.174 | 0.172 | 0.548 | 0.521 | 0.221 | 0.088 |
| CPD [73] | CVPR'19 | 0.853 | 0.866 | 0.706 | 0.052 | 0.726 | 0.729 | 0.550 | 0.115 | 0.747 | 0.770 | 0.508 | 0.059 |
| EGNet [73] | ICCV'19 | 0.848 | 0.879 | 0.702 | 0.050 | 0.732 | 0.827 | 0.583 | 0.104 | 0.737 | 0.777 | 0.509 | 0.056 |
| GCPANet [7] | AAAI'20 | 0.876 | 0.891 | 0.748 | 0.041 | 0.778 | 0.842 | 0.646 | 0.092 | 0.791 | 0.799 | 0.592 | 0.045 |
| F3Net [63] | AAAI'20 | 0.854 | 0.899 | 0.749 | 0.045 | 0.779 | 0.840 | 0.666 | 0.091 | 0.786 | 0.832 | 0.617 | 0.046 |
| MiNet-R [39] | CVPR'20 | 0.844 | 0.919 | 0.746 | 0.040 | 0.749 | 0.835 | 0.635 | 0.090 | 0.759 | 0.832 | 0.580 | 0.045 |
| SiNet [15] | CVPR'20 | 0.869 | 0.891 | 0.740 | 0.044 | 0.751 | 0.771 | 0.606 | 0.100 | 0.771 | 0.806 | 0.551 | 0.051 |
| PFNet [34] | CVPR'21 | 0.882 | 0.942 | 0.810 | 0.033 | 0.782 | 0.852 | 0.695 | 0.085 | 0.800 | 0.868 | 0.660 | 0.040 |
| Rank-Net [32] | CVPR'21 | 0.842 | 0.794 | 0.896 | 0.046 | 0.708 | 0.645 | 0.755 | 0.105 | 0.760 | 0.658 | 0.831 | 0.045 |
| R-MGL [69] | CVPR'21 | 0.893 | 0.923 | 0.813 | 0.030 | 0.775 | 0.847 | 0.673 | 0.088 | 0.814 | 0.865 | 0.666 | 0.035 |
| C$^2$F-Net [55] | IJCAI'21 | 0.888 | 0.935 | 0.828 | 0.032 | 0.796 | 0.854 | 0.719 | 0.080 | 0.813 | 0.890 | 0.686 | 0.036 |
| SiNet-V2 [13] | TPAMI'21 | 0.888 | 0.942 | 0.816 | 0.030 | 0.820 | 0.882 | 0.743 | 0.070 | 0.815 | 0.887 | 0.680 | 0.037 |
| C$^2$L-Net Ours | | 0.903 | 0.952 | 0.850 | 0.025 | 0.832 | 0.891 | 0.769 | 0.064 | 0.824 | 0.899 | 0.707 | 0.032 |

FIG. 7

| Ver. | Method | CHAMELEON (76 images) | | | CAMO-Test (250 images) | | | COD10K-Test (2,026 images) | | |
|---|---|---|---|---|---|---|---|---|---|---|
| | | $S_\alpha\uparrow$ $E_\phi\uparrow$ $F_\beta^w\uparrow$ $M\downarrow$ | | | $S_\alpha\uparrow$ $E_\phi\uparrow$ $F_\beta^w\uparrow$ $M\downarrow$ | | | $S_\alpha\uparrow$ $E_\phi\uparrow$ $F_\beta^w\uparrow$ $M\downarrow$ | | |
| (a) | Baseline | 0.859 0.905 0.744 0.044 | | | 0.805 0.849 0.695 0.085 | | | 0.799 0.860 0.624 0.045 | | |
| (b) | Baseline + TRM | 0.889 0.938 0.819 0.029 | | | 0.814 0.875 0.739 0.073 | | | 0.815 0.890 0.684 0.035 | | |
| (c) | Baseline + CFM | 0.879 0.930 0.798 0.035 | | | 0.816 0.869 0.736 0.073 | | | 0.811 0.880 0.670 0.038 | | |
| (d) | Baseline + CIM | 0.886 0.937 0.813 0.031 | | | 0.814 0.873 0.738 0.072 | | | 0.812 0.886 0.674 0.037 | | |
| (e) | Baseline + TRM + CFM | 0.889 0.940 0.834 0.028 | | | 0.821 0.884 0.748 0.068 | | | 0.820 0.889 0.695 0.034 | | |
| (f) | Baseline + TRM+ CFM+CIM | 0.903 0.952 0.850 0.025 | | | 0.832 0.891 0.769 0.064 | | | 0.824 0.899 0.707 0.032 | | |

FIG. 8

COUNTERFACTUAL CONTEXT-AWARE TEXTURE LEARNING FOR CAMOUFLAGED OBJECT DETECTION

CROSS-REFERENCE TO RELATED APPLICATION

This Application is a bypass continuation application of PCT/CN2023/081035. This application claims priority from PCT Application No. PCT/CN2023/081035, filed Mar. 13, 2023, the content of which is incorporated herein in the entirety by reference.

TECHNICAL FIELD

The present disclosure relates to the field of camouflaged object detection, and more particularly relates to a counterfactual context-aware texture learning network for exploring causalities among contexts, textures, and final predictions.

BACKGROUND

Camouflaged object detection (COD) is used to identify camouflaged objects that are "realistically" integrated with their surroundings. A major challenge to COD is that there exist ambiguous semantic regions between the foreground (camouflaged objects) and the background (surroundings).

Camouflage is generally used by objects or organisms to utilize textures, colors, illumination, etc. to blend in with surroundings and hunt or avoid being hunted [51, 54]. Inspired by this mechanism, camouflage is also widely used on the battlefield. For example, soldiers and war equipment are applied with camouflage via the use of special material or coloration to blend them with their surroundings [28]. COD aims to identify and segment camouflaged objects that are similar to their surroundings. COD has applications in various fields, such as, without limitation, lung infection segmentation [16], polyp segmentation [48], recreational art [8], photo-realistic blending [20], locust detection, and rare species detection. Interdependence between the foreground and the background: In the field of camouflaged object detection, camouflaged objects do not appear alone, they typically are present in certain relevant contexts. For example, as shown in FIG. 1, "spiders" often appear in "shrubs", "halobios" and "seaweed" usually appear together and most "Geococcyx" appear within "swamps". Therefore, the COD model will predict ambiguous masks.

As shown in FIG. 1, existing state-of-the-art camouflaged object detection methods have shown promising performance in relatively clear scenes, but the performance degrades significantly in ambiguous scenes (e.g., the boundary between the camouflaged object and its surroundings is not clear). The following problems may cause ambiguity in camouflaged object detection:

VIwhen the material, color, or illumination of the surroundings is naturally similar to the camouflaged objects, some parts of the surroundings are misidentified as the objects. Hence, ambiguity remains in conventional COD methods due to some natural similarities (e.g., material, color, or illumination) between objects and surroundings.

Causal but negatively correlated foreground regions: Camouflaged objects are concealed by promiscuous surroundings. As shown in the third row of FIG. 1, the "Geococcyx" is hidden by similar surroundings. When some parts of the camouflaged objects become "invisible" or inconspicuous due to the similar surroundings or the natural camouflage characteristics of the foreground, some regions of the camouflaged object will not be identified.

The aforementioned problems are attributed to contextual biases (i.e., ambiguous semantics) in the dataset. Therefore, contextual biases are interference factors that mislead the COD model to learn spurious correlations between the foreground and the background. For example, there are cases where a small number of "seaweed" regions were incorrectly predicted as part of "seahorses" or a few regions of "chameleon" were ignored in the final prediction.

COD methods typically learn texture features directly via a final pixel-wise accuracy constraint, but also tend to ignore causality between the prediction and the context. Further, the direct learning method utilizes a common loss function and does not encourage the model to weaken the influences of contextual bias, which may limit performance.

In recent years, there has been significant progress in COD. Early work focused on visual features, e.g., color features [37, 52], gradient [36], edge [52], and textures [3, 47]. For instance, Le et al. proposed an anabranch network, which leverages both classification and segmentation tasks for camouflaged object detection. The early work shared the first finely marked COD datasets, such as the CAMO [28], which contains 2500 images. Based on the understanding that predators discover prey by judging whether a potential prey exists and then identifying the prey, Fan et al. designed SINet which includes the search module to find coarse areas of camouflaged objects and the identification module to precisely detect the objects. Considering that CAMO is limited, a sufficiently large COD dataset was collected and shared for training powerful COD models, called COD10K [15], including 10000 images covering 78 object categories in various natural environments.

Context-aware Deep Learning. In object detection and object segmentation tasks, contextual information plays an important role in enhancing the feature representation for improving performance [2, 9]. Many efforts have been dedicated to exploiting contexts to enhance the ability of feature representation. For example, Chen et al. [5] constructed ASPP with different dilated convolutions to achieve contextual information acquisition. Zhang et. al. utilized a Multiscale Context-aware Feature Extraction Module to fuse multi-level features and capture rich context information. Mei et al. explored abundant contextual cues for robust glass detection with a novel large-field contextual feature integration module. Chen et al. [6] designed a Global Context Flow module to generate the global context information at different stages, which aims to learn the relationship among different salient regions and alleviate the dilution effect of high-level features. Informative contexts contrasting local features are explored in [11, 67]. Attention-induced Cross-level contextual information are obtained in [25, 55].

Causal Inference has gained increasing attention in recent years and has been successfully used in reinforcement learning [26], adversarial learning [27], machine learning, and natural language processing [65]. Further, more and more computer vision tasks benefit from causality [38, 45, 56-58, 62], such as image classification [31], scene graph generation [59], zero-shot recognition [68], and weakly supervised semantic segmentation [70].

Therefore, a heretofore unaddressed need exists in the art to address the aforementioned deficiencies and inadequacies.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference. In terms of notation, hereinafter, [n] represents the nth reference cited in the reference list. For example, [1] represents the first reference cited in the reference list, namely, GMSA, "GSMA intelligence," https://www.gsmaintelligence.com/, Accessed On: February 2019.

SUMMARY

In the present disclosure, the cause of the ambiguity is analyzed, and is attributed to contextual biases (i.e., spurious correlations between the foreground and the background). With the above understanding of camouflaged objects, a counterfactual context-aware texture learning network (C2TL-Net) is designed to explore the causalities among contexts, textures, and final predictions. Specifically, the C2TL-Net contains three key modules: a texture-aware refinement module (TRM), a context-aware fused module (CFM), and a counterfactual intervention module (CIM). The TRM is designed to extract discriminant features, the CFM is applied to fuse multi-scale contextual features, and the CIM is used to make unbiased predictions. Unlike most existing COD methods that directly capture contextual features by the final loss function, a counterfactual intervention strategy is disclosed to explore the causal correlations between the foreground and the background, which focuses on learning more effective context-aware textures. Extensive experiments on three challenging benchmark datasets demonstrate that the disclosed C2TL-Net significantly outperforms 19 cutting-edge methods.

In the present disclosure, a counterfactual causality method for COD is disclosed, termed counterfactual context-aware texture learning network (C2TL-Net), which focuses on learning more effective context-aware textures based on causal inference, and greatly improves COD performance. In addition, an effective context-aware texture learning and fusing framework is disclosed, which includes three key modules: the TRM, the CFM, and the CIM. The TRM is used to preliminarily capture texture features from an image, the CFM is designed to carefully search for the camouflaged object by contacting context, and the CIM is configured to identify the camouflaged object with counterfactual intervention. The main advantages of the disclosed method and framework are as follows:

First, the concept of counterfactual causality is introduced in the COD problem, and a new counterfactual intervention strategy is designed for learning more useful context-aware textures and mitigating the influences of biases (from context), which greatly improves COD performance. Second, a novel COD framework is disclosed, called C2TL-Net, which not only captures deep discriminative textures and fuses multiple-scale contextual features but also learns more effective textures based on counterfactual intervention. Third, extensive experiments on three benchmark datasets demonstrate that the disclosed C2TL-Net achieves state-of-the-art camouflaged object detection performance. Qualitative and quantitative results demonstrate the effectiveness of the disclosed method.

Causal Inference in Vision. The key idea of causal inference [43, 49] lies in counterfactual reasoning, that is, what Y' is if X is not done. Its purpose is to determine causality, i.e., calculating the causal effect (the change in Y value with or without X). After counterfactual reasoning, a causal effect e=|Y|−Y' may be determined, and causation may be judged. In the present disclosure, the theory of causality is applied to learn effective contextual information for camouflaged object detection, which greatly improves COD performance.

In one embodiment of the present disclosure, a counterfactual context-aware texture learning network system is disclosed, including: a camera configured to capture an input image; a processor configured to perform camouflaged object detection on the input image; and a memory configured to store a texture-aware refinement module (TRM), a context-aware fused module (CFM), and a counterfactual intervention module (CIM); wherein the processor is configured to execute program instructions of the TRM, the CFM, and the CIM; the TRM is configured to extract dimension features from the input image; the CFM is configured to infuse multi-scale contextual features; the CIM is configured to identify a camouflaged object with counterfactual intervention via the processor; the TRM includes: a receptive field block (RFB) configured to expand a receptive field and extract texture features; and a position attention module (PAM) and a channel attention module (CAM) configured to further refine texture-aware features and obtain discriminant feature representation; the RFB comprises five branches $b_k$, (k=1,2,3,4,5), each branch of the five branches comprising a 1×1 convolution operation to reduce a channel size to 64; each branch where k>2 further comprises a 1×(2i−1) convolutional layer, a (2i−1)×1 convolutional layer, and a (2i−1)×(2i−1) convolutional layer, with a dilation rate of (2i−1), where i=k−1; each branch where k>1 is concatenated, input into a second 1×1 convolution operation, and added with a branch of the five branches where k=1; a result of the RFB is input into a Rectified Linear Unit (ReLU) activation function to obtain an output feature $f_i' \in \mathbb{R}^{C \times H \times W}$, where C, H and W represent a channel number, a channel height, and a channel width, respectively; the output feature f' is input into the PAM and the CAM, the PAM is configured to: obtain three feature maps B, C, and D through three convolution layers, where $\{B, C, \text{ and } D\} \in \mathbb{R}^{C \times H \times W}$, and the three feature maps are reshaped to $\mathbb{R}^{C \times N}$; and multiply the transpose of B by C, and perform a softmax layer to calculate the spatial attention map $sa \in \mathbb{R}^{N \times N}$:

$$sa_{ij} = \frac{\exp(B_i \cdot C_j)}{\sum_{i=1}^{N} \exp(B_i \cdot C_j)} \quad (1)$$

where $sa_{ij}$ denotes the $j^{th}$ position's impact on the $i^{th}$ position; a loss function $L = L_{BCE}^W + L_{IoU}^W$ is used to train the counterfactual context-aware texture learning network system to learn effective textures, where $L_{BCE}^W$ is the weighted binary cross entropy (BCE) loss which restricts each pixel, and $L_{IoU}^W$ is a weighted intersection-over-union (IoU) loss that focuses on a global structure; and a total loss is formulated as:

$$L_{total} = L(Y, y) + \lambda L(Y_{effect}, y) \quad (2)$$

where y is a ground truth, $\lambda = 0{:}1$, L(Y, y) are main clues which learn general texture features, Y is a prediction of the main clues, and $\lambda L(Y_{effect}, y)$ is a counterfactual term that penalizes a wrong prediction affected by contextual biases; thereby performing the camouflaged object detection in the input image with enhanced accuracy.

In another embodiment, the PAM is configured to: multiply the transpose of sa by a matrix of the D feature map and reshape an aggregated attentive features result to $\mathbb{R}^{C \times H \times W}$; multiply the aggregated attentive features result by a scale parameter η and apply an element-wise sum operation with the output feature f' to obtain spatial feature maps $f^p \in \mathbb{R}^{C \times H \times W}$:

$$f_i^p = \eta \sum_{j=1}^{N} (sa_{ij} D_j) + f' \quad (3)$$

where η is initialized as 0 and gradually learns more weight, and $f^p$ is a weighted sum at each position which enhances a semantic representation of the feature.

In another embodiment, the CAM is configured to reshape the $f_i'$ to $\mathbb{R}^{C \times N}$, multiply a transpose of f' by the f' matrix, and apply a softmax layer to obtain channel attention maps $ca \in \mathbb{R}^{C \times C}$.

$$ca_{ij} = \frac{\exp(f_i' \cdot f_j')}{\sum_{i=1}^{N} \exp(f_i' \cdot f_j')} \quad (4)$$

where $ca_{ij}$ denotes a $j^{th}$ channel's impact on an $i^{th}$ channel.

In another embodiment, the CAM is configured to multiply a transpose of ca by the f' matrix, reshape to $\mathbb{R}^{C \times H \times W}$, multiply by a scale parameter β, and apply an element-wise sum operation with the original input feature f' to obtain channel feature maps $f^c \in \mathbb{R}^{C \times H \times W}$:

$$f_i^c = \beta \sum_{j=1}^{c} (ca_{ij} f_j') + f' \quad (5)$$

where β gradually learns a weight from an initial value of 0, and CF is a weighted sum at all channels and original features, which models long-range semantic dependencies.

In another embodiment, an element-wise sum operation is performed between f', $f^s$ and $f^c$ to obtain final texture-aware refinement feature maps $F_r$:

$$F_r = f' + f^s + f^c \quad (6).$$

In another embodiment, the CFM comprises: a coordinate attention module configured to model long-range dependencies; and two multiscale channel attention (MSCA) modules configured to aggregate local and global contexts in two different scale branches.

In another embodiment, the coordinate attention module is configured to: up-sample a high-level feature $F_{hig}$ and perform an element-wise sum operation with a low-level feature $F_{low}$; use two spatial extents of pooling kernels, (H, 1) and (1, W), to encode results along a horizontal coordinate and a vertical coordinate, respectively, calculate an output of a c-th channel at height h as:

$$z_c^h(h) = \frac{1}{W} \sum_{0 \leq i < W} x_c(h, i); \quad (7)$$

and calculate an output of the c-th channel at width w as:

$$z_c^w(w) = \frac{1}{H} \sum_{0 \leq j < H} x_c(j, w) \quad (8)$$

where $x_c$ are features of the c-th channel.

In another embodiment, the coordinate attention module is configured to: obtain a pair of direction-aware feature maps by (6) and (7); obtain intermediate feature maps $$f^i \in \mathbb{R}^{\frac{C}{r} \times H},$$

where r is a reduction ratio for controlling a block size, which are configured to extract spatial information in both a horizontal direction and a vertical direction as follows:

$$f^i = \delta(\text{Conv}_{1 \times 1}(C(z^h, z^w))) \quad (9)$$

where C is a concatenation operation, $\text{Conv}_{1 \times 1}$ is a shared 1×1 convolutional layer, and δ is a non-linear activation function.

In another embodiment, the coordinate attention module is configured to: split f along a spatial dimension into two separate tensors $$f^h \in \mathbb{R}^{\frac{C}{r} \times H}$$

and $$f^w \in \mathbb{R}^{\frac{C}{r} \times W},$$

and utilize a second $\text{Conv}_{1 \times 1}$ and sigmoid function to obtain attention weights $g^h$ and $g^w$; and obtain direction-aware and position-sensitive features $F^{dp}$ as follows:

$$F_c^{dp}(i,j) = x_c \times g_c^h(i) \times g_c^w = (j) \quad (10).$$

In another embodiment, the high-level feature $F_{hig}$ and the low-level feature $F_{low}$ are input into the two MSCA, and two-level fusion semantics are obtained.

In another embodiment, each of the two MSCA are configured to: obtain local contexts $L(x) \in \mathbb{R}^{C \times H \times W}$ and global contexts $G(x) \in \mathbb{R}^{C \times H \times W}$ as follows:

$$L(F) = B(PWC_2(\delta(B(PWC_1(F))))) \quad (11)$$

$$G(F) = B(PWC_2(\delta(B(PWC_1(GAP(F)))))) \quad (12)$$

where F are input features, $PWC_1$ and $PWC_2$ are point-wise convolutions (PWC), which exploit point-wise channel interactions for each spatial position where a kernel size of $PWC_1$ and $PWC_2$ are $$\frac{C}{r} \times C \times 1 \times 1$$

and $$\frac{C}{r} \times C \times 1 \times 1$$

respectively, B is a batch normalization layer, δ is an activation function of the ReLU, and GAP is a global average pooling; obtain refined multi-scale features F' of MSCA as follows:

$$F'=F\otimes M(F)=F\otimes \sigma(L(F)\oplus G(F)) \quad (13)$$

where $M(F)\in \mathbb{R}^{C\times H\times W}$ are generated attentional weights, $\oplus$ is an element-wise sum operation, $\sigma$ is a sigmoid function, and $\otimes$ is an element-wise multiplication operation; and obtain a fusion of contextual features $F_{fusion}$ as follows:

$$F_{fusion}=(Conv_{3\times 3}(C(F_{low}',F^{dp},F_{hig}') \quad (14)$$

where $F_{low}'$ and $F_{hig}'$ are refined multi-scale features from the low-level feature and the high-level feature, respectively, and $F^{dp}$ are the aggregated features of the direction-aware feature and position-sensitive feature, $Conv_{3\times 3}$ is a 3×3 convolutional layer In another embodiment, the CIM is configured to calculate an intervention output prediction Y according to:

$$Y_{\overline{T}}(X) = P(Y|do(T)) = \sum_c P(Y|do(\overline{T},c)P(c|X) \quad (15)$$

where X is the input image, T are hypothetical textures, P is a pixel-image level classifier, and c is the contextual biases to be mitigated from X; and calculate a total effect of learned textures according to:

$$Y_{effect}=Y_T(X)-Y_{\overline{T}}(X) \quad (16).$$

BRIEF DESCRIPTION OF THE DRAWINGS

The accompanying drawings illustrate one or more embodiments of the present disclosure and, together with the written description, serve to explain the principles of the present disclosure, wherein:

FIGS. 5A-5B illustrate an exemplary context-aware fused module wherein FIG. 5A shows a coordinate attention module and FIG. 5B shows a multi-scale channel attention module, in accordance with an embodiment of the present disclosure;

FIG. 7 illustrates an exemplary table showing a quantitative comparison between the disclosed method and other COD methods, in accordance with an embodiment of the present disclosure;

FIG. 8 illustrates an exemplary table showing ablation analyses on three datasets, in accordance with an embodiment of the present disclosure;

DETAILED DESCRIPTION

Figure 1:
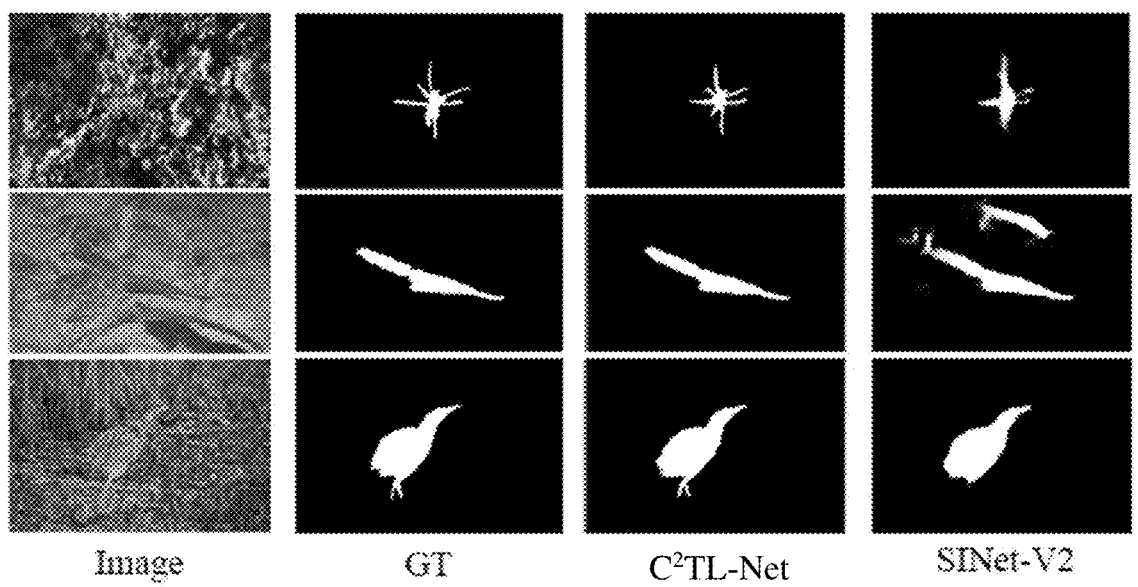
FIG. 1 illustrates an exemplary visual example of camouflaged object detection, in accordance with an embodiment of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present disclosure or of any exemplified term. Likewise, the present disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms Firstly, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present disclosure. As used herein, the singular forms "a," "an," and "the" are intended to include the multiple forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements will then be oriented on the "upper" sides of the other elements. The exemplary term "lower" can, therefore, encompass both an orientation of lower and upper, depending on the particular orientation of the figure. Similarly, for the terms "horizontal", "oblique" or "vertical", in the absence of other clearly defined references, these terms are all relative to the ground. Similarly, if the device in one of the figures is turned over, elements described as "below" or "beneath" other elements will then be oriented "above" the other elements. The exemplary terms "below" or "beneath" can, therefore, encompass both an orientation of above and below.

Unless otherwise defined, all terms (including technical and scientific terms) used herein have the same meaning as commonly understood by those of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially," "generally" or "approximately" shall generally mean within 20 percent, preferably within 10 percent, and more preferably within 5 percent of a given value or range. Numerical quantities given herein are approximate, meaning that the terms "around," "about," "substantially," "generally" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples Biological studies [22] have shown that successful predation includes search, identification, and capture. The disclosed method is designed to mimic the first two stages, where the "search" stage is divided between the TRM and the CFM for preliminary searching and careful searching, respectively, and the "identification" stage is addressed by the CIM which draws lessons from human counterfactual reasoning.

Figure 2:
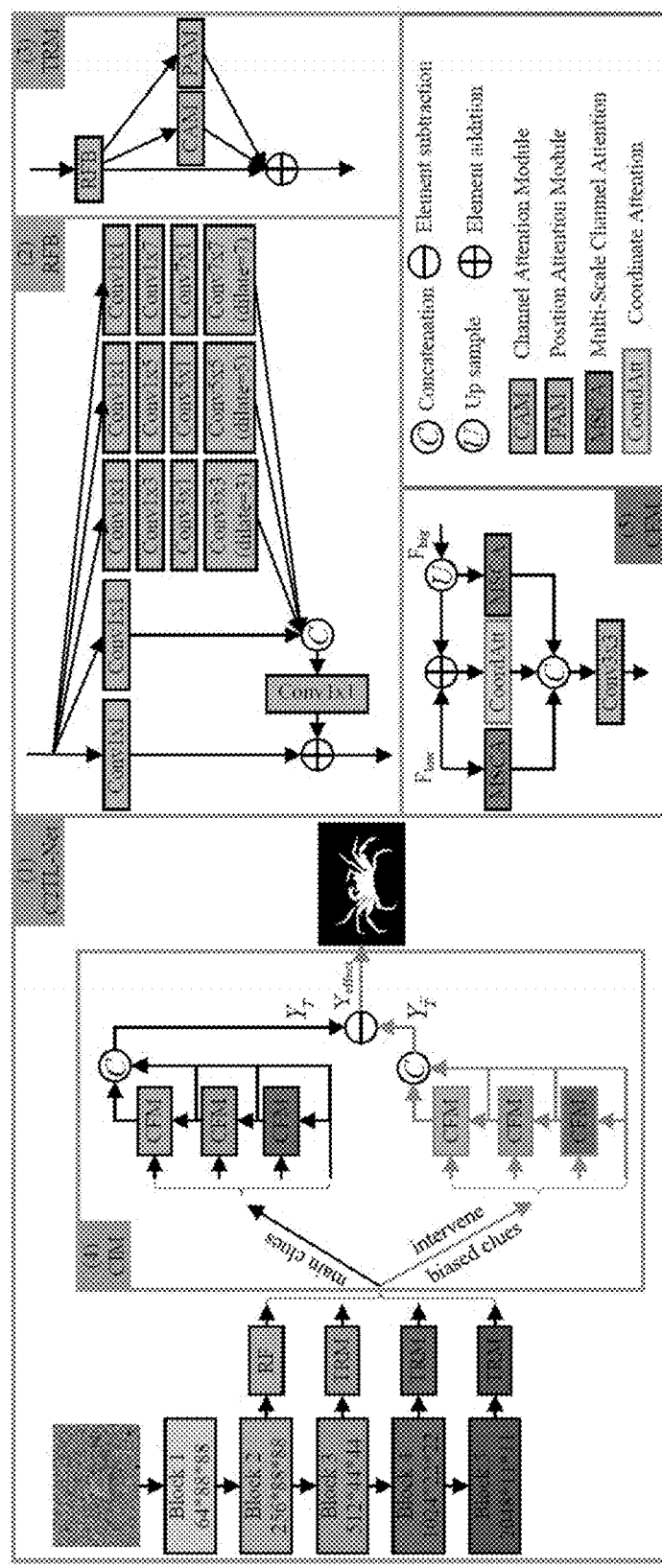
FIG. 2 illustrates an exemplary block diagram showing a counterfactual context-aware texture learning network, in accordance with an embodiment of the present disclosure.

An overview of the disclosed framework is shown in FIG. 2 (1). Given a single RGB image, Res2Net-50 [19] is used to extract a set of features at five different layers. The TRM is applied to refine rich discriminative features. The CFM is configured to fuse multi-scale contextual features. Finally, to accurately detect camouflaged objects, the CIM is configured to weaken the contextual biases of noncausal but positive or causal but negative.

The TRM is configured to obtain more texture-aware refinement feature representations. As shown in FIG. 2 (3), a receptive field block (RFB) [66] expands the receptive field and extracts richer texture features, and then applies a position attention module (PAM) and channel attention module (CAM) [17] to further refine texture-aware features and obtain discriminant feature representation.

Specifically, as shown in FIG. 2 (2), each RFB component includes five branches $b_k$, (k=1,2,3, . . . 5), each branch $b_k$ starts with a 1×1 convolution operation to reduce the channel size to 64. Next, followed by two other layers, i.e., a (2i−1) convolutional layer and a 3 convolutional layer with a specific dilation rate (2i−1) when k2. The first four branches are concatenated and then their channel size is reduced to 64 via a 3 convolutional operation. Subsequently, a fifth shortcut branch is added and the whole module is fed to a Rectified Linear Unit (ReLU) activation function to obtain the output feature $f_i' \in \mathbb{R}^{C \times H \times W}$, where C, H and W represent the channel number, height, and width, respectively.

Figure 3:
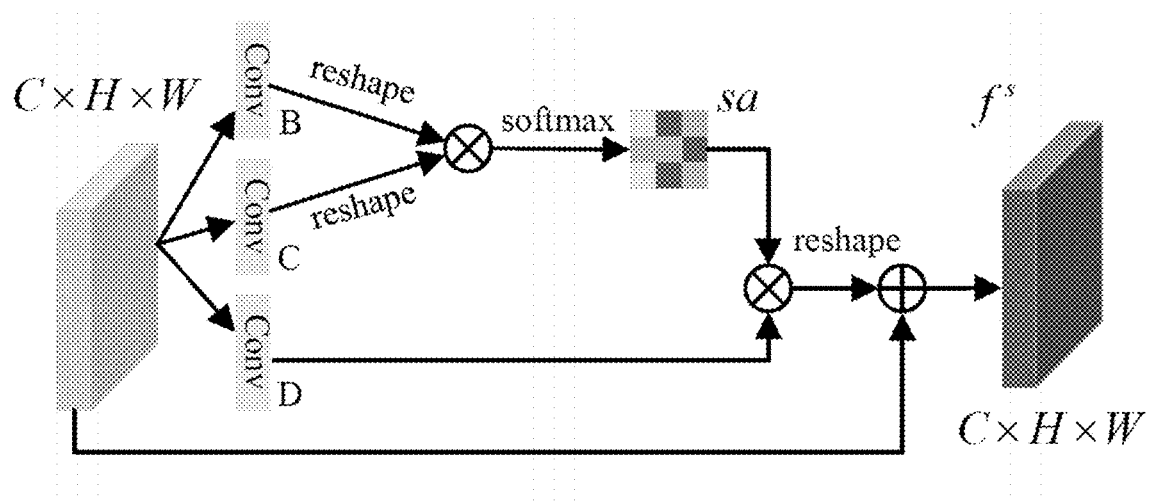
FIG. 3 illustrates an exemplary position attention module, in accordance with an embodiment of the present disclosure.

After that, the feature f' is fed into both PAM and CAM. As shown in FIG. 3, three feature maps B, C, and D are obtained through three convolution layers, where {B, C, and D}$\in \mathbb{R}^{C \times H \times W}$, then reshape them to $\mathbb{R}^{C \times N}$ respectively. Next, the transpose of B is multiplied by C, and a softmax layer is performed to calculate the spatial attention map $sa \in \mathbb{R}^{N \times N}$:

$$sa_{ij} = \frac{\exp(B_i \cdot C_j)}{\sum_{i=1}^{N} \exp(B_i \cdot C_j)} \quad (1)$$

where $sa_{ij}$ denotes the $j^{th}$ position's impact on the $i^{th}$ position.

Meanwhile, the transpose of sa is multiplied by the D matrix and the aggregated attentive features result is reshaped to $\mathbb{R}^{C \times H \times W}$. Finally, the result is multiplied by a scale parameter η and an element-wise sum operation is applied with the original input feature f' to obtain the spatial feature maps $f^p \in \mathbb{R}^{C \times H \times W}$:

$$f_i^p = \eta \sum_{j=1}^{N}(sa_{ij}D_j) + f' \qquad (3)$$

where η is initialized as 0 and gradually learns more weight. $f^p$ is a weighted sum at each position which enhances the semantic representation of the feature.

Figure 4:
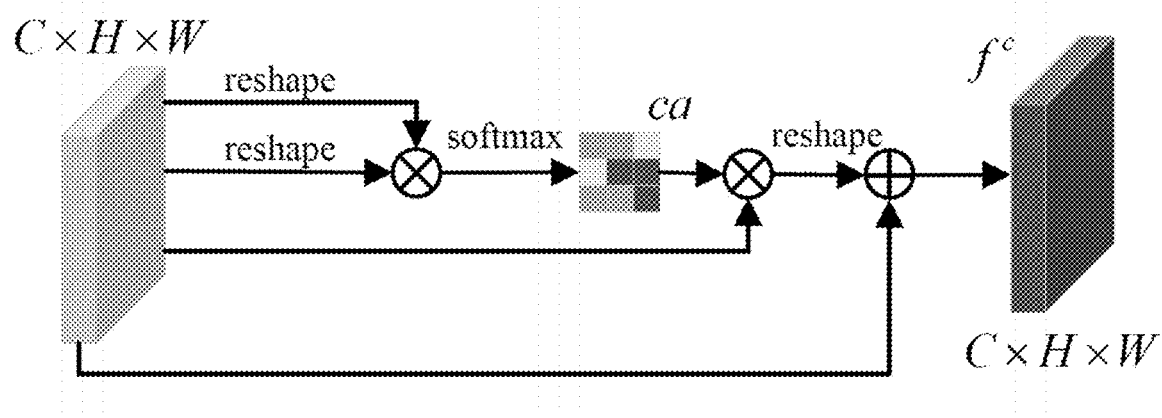
FIG. 4 illustrates an exemplary channel attention module, in accordance with an embodiment of the present disclosure.

At the same time, a channel attention module is applied to emphasize interdependent feature maps and improve the feature representation of specific semantics. As shown in FIG. 4, $f_i'$ is reshaped to $\mathbb{R}^{C \times N}$, and then multiply the transpose of f' by f' matrix. Finally, a softmax layer is applied to obtain the channel attention maps $ca \in \mathbb{R}^{C \times C}$:

$$ca_{ij} = \frac{\exp(f_i' \cdot f_j')}{\sum_{i=1}^{N}\exp(f_i' \cdot f_j')} \qquad (4)$$

where $ca_{ij}$ denotes the $j^{th}$ channel's impact on the $i^{th}$ channel. The transpose of ca is then multiplied by the f' matrix and the result is reshaped to $\mathbb{R}^{C \times H \times W}$. Finally, the result is multiplied by a scale parameter β and an element-wise sum operation is applied with the original input feature f' to obtain the channel feature maps $f^c \in \mathbb{R}^{C \times H \times W}$:

$$f_i^c = \beta \sum_{j=1}^{C}(ca_{ij}f_j') + f' \qquad (5)$$

where β gradually learns a weight from an initial value of 0. CF is a weighted sum at all channels and original features, which models long-range semantic dependencies. Thus TRM can learn more discriminant feature representations.

After the above operation, we perform an element-wise sum operation between f', $f^s$ and $f^c$ to obtain the final texture-aware refinement feature maps $F_r$:

$$F_r = f' + f^s + f^c \qquad (6)$$

Context information contains correlations between different regions [6,25,35,67]. Therefore, the multi-scale deep discriminant contextual features from the previous TRMs are fused, and abundant contextual information is captured to further improve performance. As shown in FIG. 2 (5), a context-aware fused module (CFM) is disclosed, which includes a coordinate attention module [24] to model long-range dependencies, and two multiscale channel attention (MSCA) modules [10] are utilized to aggregate local and global contexts in two different scale branches.

Figure 5A:
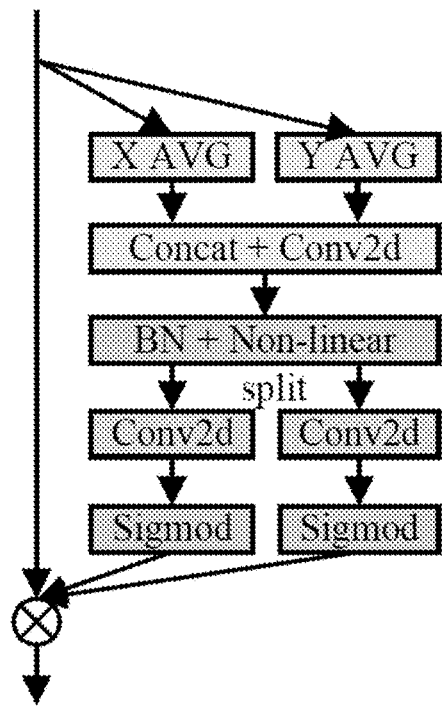

Specifically, the high-level feature $F_{hig}$ is up-sampled and an element-wise sum operation is performed with a low-level feature $F_{low}$. Then, as shown in FIG. 5a, two spatial extents of pooling kernels (H, 1) or (1, W) are used to encode the results along the horizontal coordinate and the vertical coordinate, respectively. The output of the c-th channel at height h is calculated as:

$$z_c^h(h) = \frac{1}{W} \sum_{0 \leq i < W} x_c(h, i) \qquad (7)$$

Analogously the output of the c-th channel at width w can be formulated as:

$$z_c^w(w) = \frac{1}{H} \sum_{0 \leq j < H} x_c(j, w) \qquad (8)$$

where $x_c$ are features of the c-th channel. A pair of direction-aware feature maps are obtained by the above two transformations aggregate features along the two spatial directions respectively. Intermediate feature maps $$f^i \in \mathbb{R}^{\frac{C}{r} \times H}$$

(r is the reduction ratio for controlling the block size) are then obtained, which extract spatial information in both the horizontal direction and the vertical direction as follows:

$$f^i = \delta(\text{Conv}_{1 \times 1}(C(z^h, z^w)) \qquad (9)$$

where C is a concatenation operation, $\text{Conv}_{1 \times 1}$ means a shared 1×1 convolutional layer and δ is a non-linear activation function.

After that, $f^i$ is split along the spatial dimension into two separate tensors $$f^h \in \mathbb{R}^{\frac{C}{r} \times H}$$

and $$f^w \in \mathbb{R}^{\frac{C}{r} \times W},$$

and another $\text{Conv}_{1 \times 1}$ and sigmoid function are utilized to obtain the attention weights $g^h$ and $g^w$, respectively. Finally, the direction-aware and position-sensitive features $F^{dp}$ are obtained as follows:

$$F_c^{dp}(i,j) = x_c \times g^h(i) \times g^w(j) \qquad (10)$$

Figure 5B:
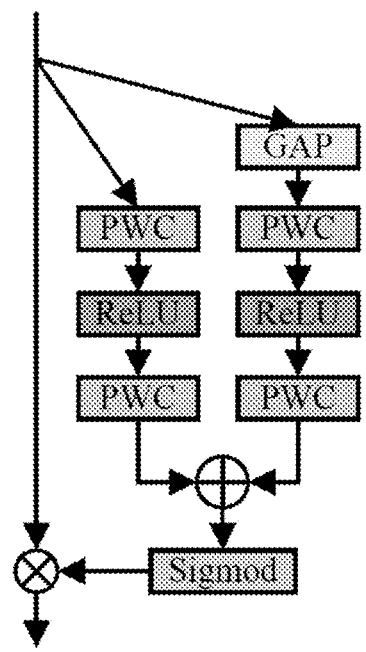

Meanwhile, as shown in FIG. 5b, the high-level feature $F_{hig}$ and the low-level feature $F_{low}$ are input into MSCA, and two-level fusion semantics are obtained. In each MSCA, local $L(x) \in \mathbb{R}^{C \times H \times W}$ and global contexts $G(x) \in \mathbb{R}^{C \times H \times W}$ are obtained as follows:

$$L(F) = B(PWC_2(\delta(B(PWC_1(F))))) \qquad (11)$$

$$G(F) = B(PWC_2(\delta(B(PWC_1(GAP(F)))) \qquad (12)$$

where F represents the input features, $PWC_1$ and $PWC_2$ denotes the point-wise convolution (PWC), which only exploits point-wise channel interactions for each spatial position, their kernel size is $$\frac{C}{r} \times C \times 1 \times 1 \text{ and } \frac{C}{r} \times C \times 1 \times 1$$

respectively, B indicates the batch normalization layer, δ is an activation function of ReLU, GAP is a global average pooling. Then the refined multi-scale features F' of MSCA are obtained as follows:

$$F' = F \otimes M(F) = F \otimes \sigma(L(F) \oplus G(F)) \qquad (13)$$

where M $(F) \in \mathbb{R}^{C \times H \times W}$ denotes the generated attentional weights, $\oplus$ is an element-wise sum operation, $\sigma$ is a sigmoid function, and $\otimes$ is an element-wise multiplication operation. Finally, the fusion of contextual features $F_{fusion}$ are obtained as follows:

$$F_{fusion} = (\text{Conv}_{3\times3}(C(F_{low}', F^{dp}, F_{hig}'))) \qquad (14)$$

where $F_{low}$ and $F_{hig}$ represent the refined multi-scale feature from the low-level feature and the high-level feature separately. $F^{dp}$ are the aggregated features of the direction-aware feature and position-sensitive feature. $\text{Conv}_{3\times3}$ is a 3×3 convolutional layer.

As disclosed below, the causalities among input image X (which usually has contextual biases/confounders), textures T, and pixel-level predictions Y are formualted using a causal graph [41], and it is revealed how the contextual biases of contexts affect textures quality.

Figure 6:
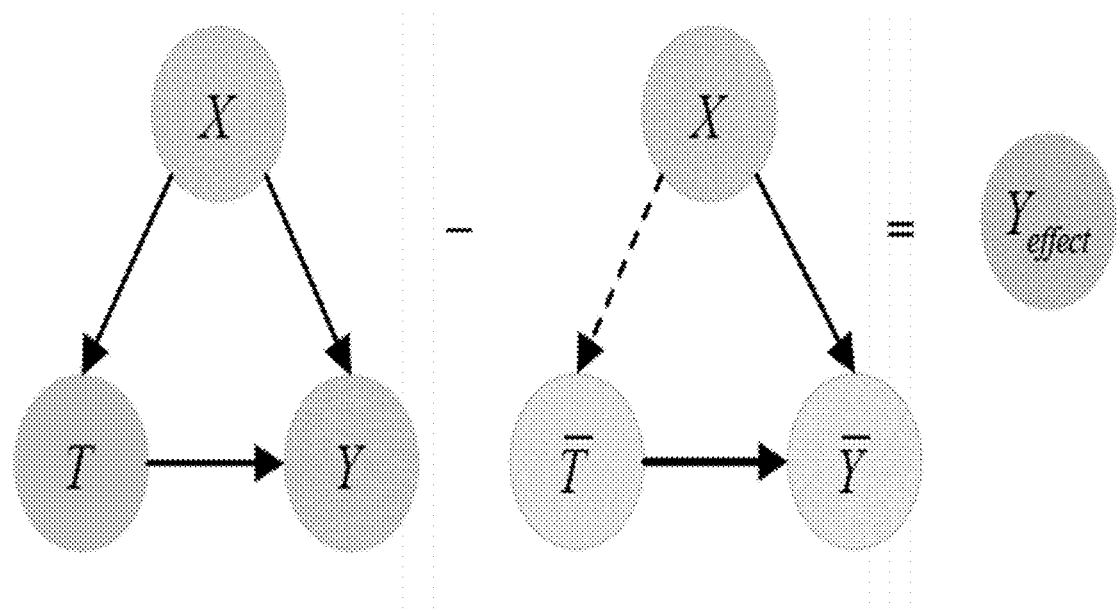
FIG. 6 illustrates a causal graph of a causal intervention module, in accordance with an embodiment of the present disclosure.

As presented in FIG. 6, the direct links denote the causalities between the two nodes: cause→effect. The link X→T represents the reduced corresponding textures from image X. As shown by the link X→T→Y, the context information affects the texture features T and ultimately prediction Y. The counterfactual intervention is a process that investigates the causal effect by intervening in the conditions of influence [21, 42, 61]. As will be described, counterfactual intervention do(T=T̄) is used to reduce the effect of contextual biases. In detail, do(T=T̄) means to cut-off the link X→A, so that T is no longer affected by its causal parent X, where T is the hypothetical textures (e.g., mean value of training set or zero vector). Thus, the intervention output prediction Y is calculated as:

$$Y_{\bar{T}}(X) = P(Y \mid do(T)) = \sum_c P(Y \mid do(\bar{T}, c) P(c \mid X) \qquad (15)$$

where P is a pixel-image level classifier, and c is the contextual biases to be mitigated from X. Based on causal inference [60,61], the total effect of the learned textures can be calculated as:

$$Y_{effect} = Y_T(X) - Y_{\bar{T}}(X) \qquad (16)$$

A loss function $L = L_{BCE}^W + L_{IoU}^W$ is used to train the disclosed model to learn more effective textures. Specifically, $L_{BCE}^W$ is the weighted binary cross entropy (BCE) [64] loss which restricts each pixel, and $L_{IoU}^W$ is the weighted intersection-over-union (IoU) [64] loss that focuses on the global structure. At last, the total loss can be formulated as:

$$L_{total} = L(Y, y) + \lambda L(Y_{effect}, y) \qquad (2)$$

where y represents the ground truth, $\lambda = 0.1$ in the present embodiment, the first term L(Y, y) are the main clues which learn general texture features, and the second term $\lambda L(Y_{effect}, y)$ is the counterfactual term that penalizes the wrong prediction affected by contextual biases.

Datasets: Three widely-used COD benchmark datasets are used to evaluate the disclosed method, including CAMO [28], and COD10K [15]. CAMO has 1250 camouflaged images (which are divided into 1K for training and 0.25K for testing) covering 8 categories. COD10K consists of 5,066 camouflaged images (3040 for training, 2026 for testing), covering 5 super-classes and 69 sub-classes.

Evaluation Metrics: Four popular and standard metrics are used to evaluate the performance of the disclosed method: structure-measure ($S_\alpha$) [12], E-measure ($E_\phi$) [14], weighted F-measure ($F_\beta^\omega$) [33], and mean absolute error (M) [14]. Structure-measure ($S_\alpha$) [12] is utilized to compute the structural similarity between object-aware and region-aware. E-measure ($E_\phi$) [14] is used to evaluate the overall and local accuracy of camouflaged object detection, which is related to the human visual perception mechanism. Weighted F-measure ($F_\beta^\omega$) [33] is a comprehensively reliable measure of both weighted precision and weighted recall. Mean absolute error (M) evaluates the element-wise difference between the normalized prediction and the ground truth.

Implementation Details: in the present embodiment, the network of the present disclosure is implemented in PyTorch [40], Res2Net-50 [18] is used as the backbone network, which is trained on ImageNet [50], and other newly added layers are randomly initialized. The input images and ground truth were resized to 352×352. Adam is used to optimize the network with a learning rate 1e−4, dividing by 10 every 50 epochs. 3 hours are needed to converge for 50 epochs for training on an NVIDIA® Tesla V100 GPU with a batch size of 36.

4.2. Comparison with the SOTA Methods: the disclosed method is compared with 19 state-of-the-art COD methods, including FPN [29], PSPNet [72], UNet++[1], PiCANet [30], MSRCNN [23], BASNet [46], PFANet [74], HTC [4], CPD [73], EGNet [73], GCPANet [7], F3Net [63], MINet-R [39], SINet [15], PFNet [34], Rank-Net [32], RMGL [69], C2F-Net and SINet-V2 [13]. For a fair comparison, the results of these methods are taken from PFNet [34], C2F-Net [55], and SINet-V2 [13].

Quantitative Evaluation: FIG. 7 summarizes the quantitative results of $C^2$TL-Net compared with the other 19 state-of-the-art methods on the three benchmark datasets. As shown, $C^2$TL-Net outperforms all the other methods with a large margin on all four standard metrics. Specifically, for example, compared with the state-of-art COD method SINet-V2, $F_\beta^\omega$ increased by 3.4%, 2.6%, and 2.7% on the CAMO [28], and COD10K [15] dataset, respectively. These experimental results show that $C^2$TL-Net achieves the best performance among the COD methods.

Figure 9:
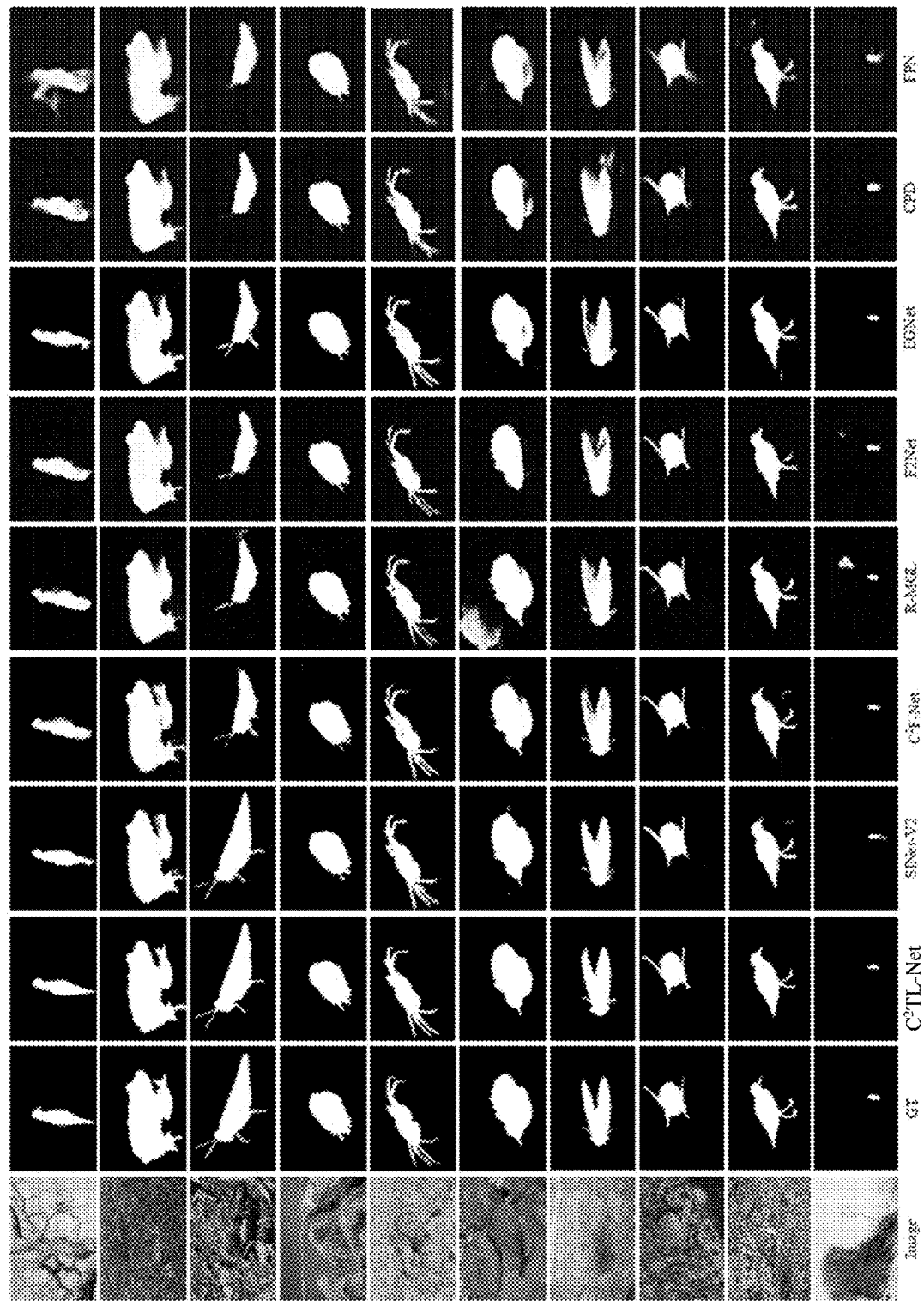
FIG. 9 illustrates qualitative comparisons between the disclosed method and other COD methods, in accordance with an embodiment of the present disclosure.

Qualitative Evaluation. FIG. 9 visually shows the qualitative results of $C^2$TL-Net with other cutting-edge methods. It can be seen that the other compared methods detect a few irrelevant surroundings or neglect some regions of the camouflaged objects (e.g., the 3-th, 6-th, and 9-th rows). By contrast, $C^2$TL-Net detects more accurate and complete camouflaged objects, including large camouflaged objects (e.g., the 2-th, 4-th, and 6-th rows), small camouflaged objects (e.g., the last row), and fine-grained textual features of the camouflaged object (e.g., the 3-th, 5-th, and 7-th rows). As shown, $C^2$TL-Net mitigates the biases of context and learns more effective textures.

To validate the effectiveness of each of the key modules, six ablation study experiments to verify the importance of the three modules, i.e., the texture-aware refinement module (TRM), the context-aware fused module (CFM), and the casual inference module (CIM), and the results are shown in FIG. 8.

The effectiveness of TRM. In the table shown in FIG. 8, (a) is a baseline, where TRM, CFM, and CIM are removed from the network, and the last four layers are simply concatenated. Compared with the baseline (a), adding TRM in (b) achieves better results. This indicates that the TRM plays an important role in achieving high performance for camouflaged object detection tasks.

The effectiveness of CFM. From (c) and (c) in FIG. 8, adding CFM on the Baseline or TRM significantly improves results, which clearly demonstrates that CFM enables $C^2$TL- Net to capture rich context-aware features and results in more accurate camouflaged object detection.

The effectiveness of CIM. As shown by (d) and (f), CIM further improves the metric results. Specifically, compared with (c) and (f), 1.2%, 0.7% and 1.0% performance improvement in terms of $E_\phi$ on the CAMO [28], and COD10K [15] datasets, respectively. This clearly indicates that the CIM is helpful for improving the performance of camouflaged object detection.

Figure 10:
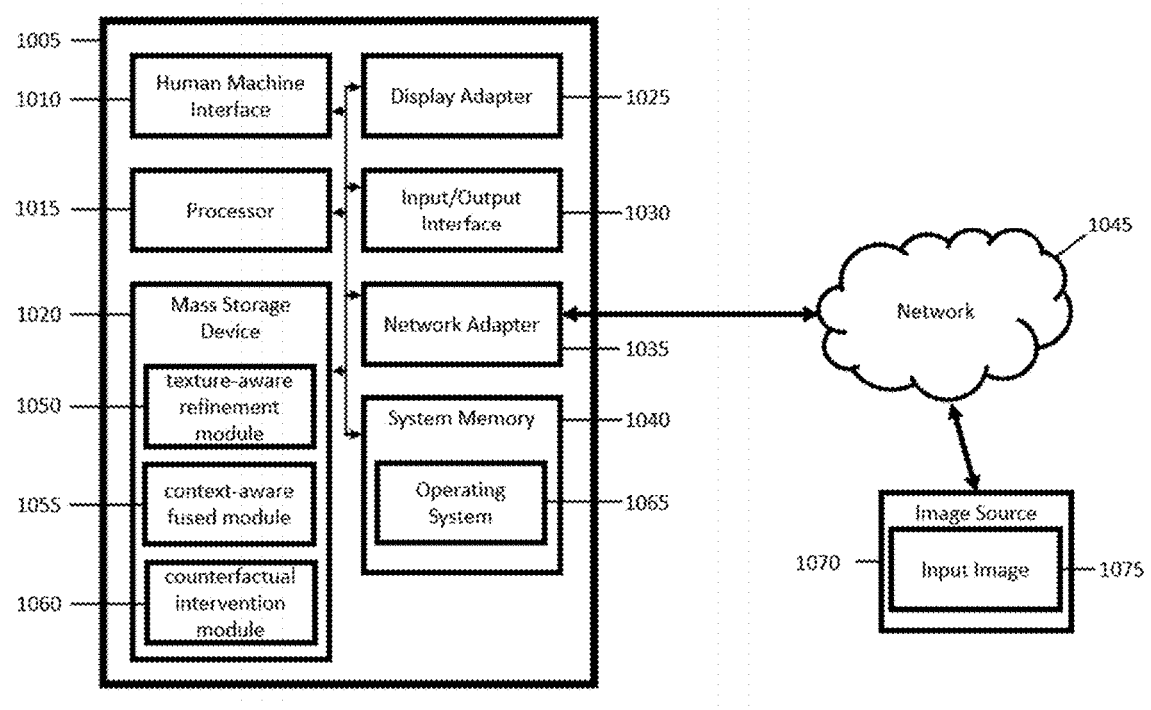
FIG. 10 illustrates a block diagram illustrating an exemplary computing system in which the present system and method can operate provided by an embodiment of the present disclosure.

FIG. 10 is a block diagram illustrating an exemplary computing system in which the present system and method can operate provided by an embodiment of the present disclosure.

Referring to FIG. 10, the methods and systems of the present disclosure may be implemented on one or more computers, such as computer 1005. The methods and systems disclosed may utilize one or more computers to perform one or more functions in one or more locations. The processing of the disclosed methods and systems may also be performed by software components. The disclosed systems and methods may be described in the general context of computer-executable instructions such as program modules, being executed by one or more computers or devices. For example, the software components include for example, without limitation, texture-aware refinement module 1050, context-aware fused module 1055, and counterfactual intervention module 1060. Texture-aware refinement module (TRM) 1050 is configured to extract dimension features from the input image. Context-aware fused module 1055 is configured to infuse multi-scale contextual features. Counterfactual intervention module 1060 is configured to identify a camouflaged object with counterfactual intervention. These program modules may be stored on mass storage device 1020 of one or more computers devices, and may be executed by one or more processors, such as processor 1015. Each of the operating modules may comprise elements of programming and data management software.

The components of the one or more computers may comprise, but are not limited to, one or more processors or processing units, such as processor 1015, system memory 1040, mass storage device 1020, Input/Output Interface 1030, display adapter 1025, network adaptor 1035, and a system bus that couples various system components. The one or more computers and image source 1070 may be implemented over a wired or wireless network connection at physically separate locations, implementing a fully distributed system. Additionally, image source 1070 may include the one or more computers such that image source 1070 and the one or more computers may be implemented in a same physical location. By way of example, without limitation, the one or more computers may be a personal computer, a portable computer, a smart device, a network computer, a peer device, or other common network node, and so on. Logical connections between one or more computers and image source 1070 may be made via network 1045, such as a local area network (LAN) and/or a general wide area network (WAN).

Image source 1070 may be configured for capturing input image 1075 and communicating input image 1075 to computer 1005 for image classification. Input image 1070 may be any type of image known in the art. For example, without limitation and as shown in FIG. 1, input image may be an image of a spider camouflaged within a shrub, a halobios camouflaged with seaweed, a Geococcyx camouflaged in a swamp, etc. Input image 1075 may be captured directly by image source 1070 may be image capturing hardware such as, without limitation, a camera, scanner, etc. Alternatively, image source 1070 may be configured to digitally download or create an input image.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

REFERENCES

[1] Zongwei Zhou and Mahfuzur Rahman Siddiquee, Nima Tajbakhsh, and Jianming Liang. Unet++: A nested u-net architecture for medical image segmentation. In *DLMIA*, 2018. 6, 8
[2] Roy R Behrens. Seeing through camouflage: Abbott Thayer, background-picturing and the use of cutout silhouettes. *Leonardo*, 51(1):40-46, 2018. 2
[3] Nagappa U. Bhajantri and P. Nagabhushan. Camouflage defect identification: a novel approach. In *In International Conference on Information Technology*, 2006. 2
[4] Kai Chen, Jiangmiao Pang, Jiaqi Wang, Yu Xiong, Xiaoxiao Li, Shuyang Sun, Wansen Feng, Ziwei Liu, Jianping Shi, Wanli Ouyang, and et al. Hybrid task cascade for instance segmentation. In *CVPR*, 2019. 6, 8
[5] Liang-Chich Chen, George Papandreou, Iasonas Kokkinos, Kevin Murphy, and Alan L Yuille. Deeplab: Semantic image segmentation with deep convolutional nets, Atrous convolution, and fully-connected crfs. *IEEE TPAMI*, 40(4):834-848, 2018. 2
[6] Zuyao Chen, Qianqian Xu, Runmin Cong, and Qingming Huang. Global context-aware progressive aggregation network for salient object detection. In *AAAI*, 2020. 2, 4
[7] Zuyao Chen, Qianqian Xu, Runmin Cong, and Qingming Huang. Global context-aware progressive aggregation network for salient object detection. In *AAAI*, 2020. 6, 8
[8] Hung-Kuo Chu, Wei-Hsin Hsu, Niloy J. Mitra, Daniel Cohen-Or, Tien-TsinWong, and Tong-Yee Lee. Camouflage images. *ACM Trans. Graph.*, 29(4):51-1, 2010. 1
[9] I C Cuthill. Camouflage. *Journal of Zoology*, 308(2):75-92, 2019. 2
[10] Yimian Dai, Fabian Gieseke, Stefan Oehmcke, Yiquan Wu, and Kobus Barnard. Attentional feature fusion. In *WACV*, 2020. 4
[11] Henghui Ding, Xudong Jiang, Bing Shuai, Ai Qun Liu, and Gang Wang. Context contrasted feature and gated multiscale aggregation for scene segmentation. In *CVPR*, 2018. 3
[12] Deng-Ping Fan, Ming-Ming Cheng, Yun Liu, Tao Li, and Ali Borji. Structure-measure: A new way to evaluate foreground maps. In *ICCV*, 2017. 6
[13] Deng-Ping Fan, Ge-Peng Ji, Ming-Ming Cheng, and Ling Shao. Concealed object detection. *IEEE TPAMI*, 66(12):9909-9917, 2021. 6, 8

[14] Deng-Ping Fan, Ge-Peng Ji, Xuebin Qin, and Ming-Ming Cheng. Cognitive vision inspired object segmentation metric and loss function. In *SCIENTIA SINICA Informationis*, 2021. 6

[15] Deng-Ping Fan, Ge-Peng Ji, Guolei Sun, Ming-Ming Cheng, Jianbing Shen, and Ling Shao. Camouflaged object detection. In *CVPR*, 2020. 2, 6, 8

[16] Deng-Ping Fan, Tao Zhou, Ge-Peng Ji, Yi Zhou, Geng Chen, Huazhu Fu, Jianbing Shen, and Ling Shao. Inf-net: Automatic covid-19 lung infection segmentation from ct images. 2020. 1

[17] Jun Fu, Jing Liu, Haijie Tian, Yong Li, Yongjun Bao, Zhiwei Fang, and Hanqing Lu. Dual attention network for scene segmentation. In *CVPR*, 2019. 3

[18] Shanghua Gao, Ming-Ming Cheng, Kai Zhao, Xin-Yu Zhang, Ming-Hsuan Yang, and Philip HSTorr. Res2net: A new multi-scale backbone architecture. *IEEE TPAMI*, 2019. 7

[19] Shang-Hua Gao, Ming-Ming Cheng, Kai Zhao, Xin-Yu Zhang, Ming-Hsuan Yang, and Philip Torr. Res2net: A new multi-scale backbone architecture. *IEEE TPAMI*, 2019. 3

[20] Shiming Ge, Xin Jin, Qiting Ye, Zhao Luo, and Qiang Li. Image editing by object-aware optimal boundary searching and mixed-domain composition. *Computational Visual Media*, 4(1):71-82, 2018. 1

[21] York Hagmayer, Steven A Sloman, David A Lagnado, and Michael R Waldmann. Causal reasoning through intervention. *Causal learning: Psychology, philosophy, and computation*, 2007. 5

[22] Joanna R Hall, Innes C Cuthill, Roland J Baddeley, Adam J Shohet, and Nicholas E Scott-Samuel. Camouflage, detection and identification of moving targets. In *Proceedings of The Royal Society B: Biological Sciences*, 2013. 3

[23] Kaiming He, Georgia Gkioxari, Piotr Doll'ar, and Ross Girshick. Mask r-cnn. In *ICCV*, 2017. 6, 8

[24] Qibin Hou, Daquan Zhou, and Jiashi Feng. Coordinate attention for efficient mobile network design. In *CVPR*, 2021. 4

[25] Zilong Huang, Xinggang Wang, Lichao Huang, Chang Huang, Yunchao Wei, and Wenyu Liu. Ccnet: Criss-cross attention for semantic segmentation. In *ICCV*, 2019. 3, 4

[26] Nathan Kallus and Angela Zhou. Confounding-robust policy improvement. 2018. 3

[27] Murat Kocaoglu, Christopher Snyder, Alexandros G Dimakis, and Sriram Vishwanath. Causalgan: Learning causal implicit generative models with adversarial training, 2017. arXiv preprint arXiv: 1709.02023. 3

[28] Trung-Nghia Le, Tam V. Nguyen, Zhongliang Nie, Minh-Triet Tran, and Akihiro Sugimoto. Anabranch network for camouflaged object segmentation. 2019. 1, 2, 6, 8

[29] Tsung-Yi Lin, Piotr Doll'ar, Ross Girshick, Kaiming He adn Bharath Hariharan, and Serge Belongie. Feature pyramid networks for object detection. In *CVPR*, 2017. 6, 8

[30] Nian Liu, Junwei Han, and Ming-Hsuan Yang. Picanet: Learning pixel-wise contextual attention for saliency detection. In *CVPR*, 2018. 6, 8

[31] David Lopez-Paz, Robert Nishihara, Soumith Chintala, Bernhard Scholkopf, and L'eon Bottou. Discovering causal signals in images. In *CVPR*, 2017. 3

[32] Yunqiu Lv, Jing Zhang, Yuchao Dai, Aixuan Li, Bowen Liu, Nick Barnes, and Deng-Ping Fan. Simultaneously localize, segment and rank the camouflaged objects. In *CVPR*, 2021. 6, 8

[33] Ran Margolin, Lihi Zelnik-Manor, and Ayellet Tal. How to evaluate foreground maps? In *CVPR*, 2014. 6, 7

[34] Haiyang Mei, Ge-Peng Ji, Ziqi Wei, Xin Yang, Xiaopeng Wei, and Deng-Ping Fan. Camouflaged object segmentation with distraction mining. In *CVPR*, 2021. 6, 8

[35] Haiyang Mei, Xin Yang, Yang Wang, Yuanyuan Liu, Shengfeng He, Qiang Zhang, Xiaopeng Wei, and Rynson W. H. Lau. Don't hit me! glass detection in real-world scenes. In *CVPR*, 2020. 2, 4

[36] Ajoy Mondal. Camouflaged object detection and tracking: A survey. In *IJIG*, 2020. 2

[37] Iv'an Huerta Daniel Rowe Mikhail Mozerov and Jordi Gonz'alez. Improving background subtraction based on a casuistry of colour-motion segmentation problems. In *In Iberian Conference on Pattern Recognition and Image Analysis*, 2007. 2

[38] Yulei Niu, Kaihua Tang, Hanwang Zhang, Zhiwu Lu, Xian-Sheng Hua, and Ji-Rong Wen. Counterfactual vqa: A causeeffect look at language bias. In *CVPR*, 2021. 3

[39] Youwei Pang, Xiaoqi Zhao, Lihe Zhang, and Huchuan Lu. Multi-scale interactive network for salient object detection. In *CVPR*, 2020. 6, 8

[40] Adam Paszke, Sam Gross, Francisco Massa, Adam Lerer, James Bradbury, Gregory Chanan, Trevor Killeen, Zeming Lin, Natalia Gimelshein, Luca Antiga, and et al. Pytorch: An imperative style, high-performance deep learning library. 2019. 7

[41] Judea Pearl. Causality: Models, reasoning and inference. *Springer*, 2000. 5

[42] Judea Pearl. Direct and indirect effects. *arXiv preprint arXiv:* 1301.2300, 2013. 5

[43] Judea Pearl, Madelyn Glymour, and Nicholas P Jewel. Causal inference in statistics: A primer. 2016. 3

[44] Judea Pearl and Dana Mackenzie. The book of why: The new science of cause and effect. *Basic Books*, 2018. 2

[45] Jiaxin Qi, Yulei Niu, Jianqiang Huang, and Hanwang Zhang. Two causal principles for improving visual dialog. In *CVPR*, 2020. 3

[46] Xuebin Qin, Zichen Zhang, Chenyang Huang, Chao Gao, Masood Dehghan, and Martin Jagersand. Basnet: Boundaryaware salient object detection. In *CVPR*, 2019. 6, 8

[47] Ch Kavitha B Prabhakara Rao and A. Govardhan. An efficient content based image retrieval using color and texture of image sub-blocks. *International Journal of Engineering Science and Technology*, 3(2): 1060-1068, 2011. 2

[48] Pranet: Parallel reverse attention network for polyp segmentation. Deng-ping fan and ge-peng ji and tao zhou and geng chen and huazhu fu and jianbing shen and and ling shao. In *MICCAI*, 2020. 1

[49] Donald B Rubin. Essential concepts of causal inference: a remarkable history and an intriguing future. *Biostatistics & Epidemiology*, 3(1): 140-155, 2019. 3

[50] Olga Russakovsky, Jia Deng, Hao Su, Jonathan Krause, Sanjeev Satheesh, Sean Ma, Zhiheng Huang, Andrej Karpathy, Aditya Khosla, Michael Bernstein, and et al. Imagenet large scale visual recognition challenge. *International journal of computer vision*, 115(3):211-252, 2015. 7

[51] C. Dhawale S. Singh and S. Misra. Survey of object detection methods in camouflaged image. *Journal of IERI Procedia*, 4(1):351-357, 2003. 1

[52] Punnarai Siricharoen, Supavadee Aramvith, Thanarat H. Chalidabhongse, and Supakorn Siddhichai. Robust

[53] Martin Stevens and Sami Merilaita. Animal camouflage: current issues and new perspectivese. *Philosophical Transactions of the Royal Socity B*, 2009. 1

[54] Yujia Sun, Geng Chen, Tao Zhou, Yi Zhang, and Nian Liu. Context-aware cross-level fusion network for camouflaged object detection. *IJCAI*, 2021. 3, 6, 8

[55] Zhongqi Yue Hanwang Zhang Qianru Sun and Xiansheng Hua. Interventional few-shot learning. 2020. 3

[56] Kaihua Tang, Jianqiang Huang, and Hanwang Zhang. Longtailed classification by keeping the good and removing the bad momentum causal effect. 2020. 3

[57] Kaihua Tang, Yulei Niu, Jianqiang Huang, Jiaxin Shi, and Hanwang Zhang. Unbiased scene graph generation from biased training. In *CVPR*, 2020. 3

[58] Kaihua Tang, Yulei Niu, Jianqiang Huang, Jiaxin Shi, and Hanwang Zhang. Unbiased scene graph generation from biased training. In *CVPR*, 2020. 3

[59] Tyler J VanderWeele. A three-way decomposition of a total effect into direct, indirect, and interactive effects. *Epidemiology (Cambridge, Mass.)*, 24(2):224, 2013. 6

[60] Tyler J VanderWeele. Explanation in causal inference: methods for mediation and interaction, 2015. Oxford University Press. 5, 6

[61] Tan Wang, Jianqiang Huang, Hanwang Zhang, and Qianru Sun. Visual commonsense r-cnn. In *CVPR*, 2020. 3

[62] Jun Wei, Shuhui Wang, and Qingming Huang. F3net: Fusion, feedback and focus for salient object detection. In *AAAI*, 2020. 6, 8

[63] Jun Wei, Shuhui Wang, and Qingming Huang. F3net: Fusion, feedback and focus for salient object detection. In *AAAI*, 2020. 6

[64] ZachWood-Doughty, Ilya Shpitser, and Mark Dredze. Challenges of using text classifiers for causal inference. *EMNLP*, 2018:4586, 2018. 3

[65] Zhe Wu, Li Su, and Qingming Huang. Cascaded partial decoder for fast and accurate salient object detection. In *CVPR*, 2019. 3

[66] Xin Yang, Haiyang Mei, Ke Xu, Xiaopeng Wei, Baocai Yin, and Rynson W. H. Lau. Where is my mirror? In *ICCV*, 2019. 3, 4

[67] Zhongqi Yue, Tan Wang, Qianru Sun, Xian-Sheng Hua, and Hanwang Zhang. Counterfactual zero-shot and open-set visual recognition. In *CVPR*, 2021. 3

[68] Qiang Zhai, Xin Li, Fan Yang, Chenglizhao Chen, Hong Cheng, and Deng-Ping Fan. Mutual graph learning for camouflaged object detection. In *CVPR*, 2021. 6, 8

[69] Dong Zhang, Hanwang Zhang, Jinhui Tang, Xiansheng Hua, and Qianru Sun. Causal intervention for weakly-supervised semantic segmentation. 2020. 3

[70] Lu Zhang, Ju Dai, Huchuan Lu, You He, and Gang Wang. A bi-directional message passing model for salient object detection. In *CVPR*, 2018. 2

[71] Hengshuang Zhao, Jianping Shi, Xiaojuan Qi, Xiaogang Wang, and Jiaya Jia. Pyramid scene parsing network. In *CVPR*, 2017. 6, 8

[72] Jia-Xing Zhao, Jiang-Jiang Liu, Deng-Ping Fan, Yang Cao, Jufeng Yang, and Ming-Ming Cheng. Egnet: Edge guidance network for salient object detection. In *ICCV*, 2019. 6, 8

[73] Ting Zhao and Xiangqian Wu. Pyramid feature attention network for saliency detection. In *CVPR*, 2019. 6, 8

What is claimed is:

1. A counterfactual context-aware texture learning network system, comprising:
   a camera configured to capture an input image;
   a processor configured to perform camouflaged object detection on the input image; and
   a memory configured to store a texture-aware refinement module (TRM), a context-aware fused module (CFM), and a counterfactual intervention module (CIM);
   wherein the processor is configured to execute program instructions of the TRM, the CFM, and the CIM;
   the TRM is configured to extract dimension features from the input image;
   the CFM is configured to infuse multi-scale contextual features;
   the CIM is configured to identify a camouflaged object with counterfactual intervention via the processor;
   the TRM comprises:
      a receptive field block (RFB) configured to expand a receptive field and extract texture features; and
      a position attention module (PAM) and a channel attention module (CAM) configured to further refine texture-aware features and obtain discriminant feature representation;
   the RFB comprises five branches $b_k$, (k=1,2,3,4,5), each branch of the five branches comprising a 1×1 convolution operation to reduce a channel size to 64;
   each branch where k>2 further comprises a 1×(2i−1) convolutional layer, a (2i−1)×1 convolutional layer, and a (2i−1)×(2i−1) convolutional layer, with a dilation rate of (2i−1), where i=k−1;
   each branch where k>1 is concatenated, input into a second 1×1 convolution operation, and added with a branch of the five branches where k=1;
   a result of the RFB is input into a Rectified Linear Unit (ReLU) activation function to obtain an output feature $f'_i \in \mathbb{R}^{C \times H \times W}$, where C, H and W represent a channel number, a channel height, and a channel width, respectively;
   the output feature f' is input into the PAM and the CAM, the PAM is configured to:
      obtain three feature maps B, C, and D through three convolution layers, where $\{B, C, \text{and } D\} \in \mathbb{R}^{C \times H \times W}$, and the three feature maps are reshaped to $\mathbb{R}^{C \times N}$; and
      multiply the transpose of B by C, and perform a softmax layer to calculate the spatial attention map $sa \in \mathbb{R}^{N \times N}$:

$$sa_{ij} = \frac{\exp(B_i \cdot C_j)}{\sum_{i=1}^{N} \exp(B_i \cdot C_j)} \quad (1)$$

where $sa_{ij}$ denotes the $j^{th}$ position's impact on the $i^{th}$ position;
a loss function $L = L_{BCE}^W + L_{IoU}^W$ is used to train the counterfactual context-aware texture learning network system to learn effective textures, where $L_{BCE}^W$ is the weighted binary cross entropy (BCE) loss which restricts each pixel, and Lou is a weighted intersection-over-union (IoU) loss that focuses on a global structure; and
a total loss is formulated as:

$$L_{total} = L(Y, y) + \lambda L(Y_{effect}, y) \quad (2)$$

where y is a ground truth, λ=0:1, L(Y, y) are main clues which learn general texture features, Y is a prediction of the main clues, and $\lambda L(Y_{effect}, y)$ is a counterfactual term that penalizes a wrong prediction affected by contextual biases;

thereby performing the camouflaged object detection in the input image with enhanced accuracy.

2. The counterfactual context-aware texture learning network system of claim 1, wherein the PAM is configured to:

multiply the transpose of sa by a matrix of the D feature map and reshape an aggregated attentive features result to $\mathbb{R}^{C \times H \times W}$;

multiply the aggregated attentive features result by a scale parameter η and apply an element-wise sum operation with the output feature f' to obtain spatial feature maps $f^p \in \mathbb{R}^{C \times H \times W}$:

$$f_i^p = \eta \sum_{j=1}^{N} (sa_{ij} D_j) + f' \qquad (3)$$

where η is initialized as 0 and gradually learns more weight, and $f^p$ is a weighted sum at each position which enhances a semantic representation of the feature.

3. The counterfactual context-aware texture learning network system of claim 2, wherein the CAM is configured to reshape the $f_i'$ to $\mathbb{R}^{C \times N}$, multiply a transpose of f' by the f' matrix, and apply a softmax layer to obtain channel attention maps $ca \in \mathbb{R}^{C \times C}$:

$$ca_{ij} = \frac{\exp(f_i' \cdot f_j')}{\sum_{i=1}^{N} \exp(f_i' \cdot f_j')} \qquad (4)$$

where $ca_{ij}$ denotes a $j^{th}$ channel's impact on an $i^{th}$ channel.

4. The counterfactual context-aware texture learning network system of claim 3, wherein the CAM is configured to multiply a transpose of ca by the f' matrix, reshape to $\mathbb{R}^{C \times H \times W}$ multiply by a scale parameter β, and apply an element-wise sum operation with the original input feature f' to obtain channel feature maps $f^c \in \mathbb{R}^{C \times H \times W}$:

$$f_i^c = \beta \sum_{j=1}^{C} (ca_{ij} f_j') + f' \qquad (5)$$

where β gradually learns a weight from an initial value of 0, and $C^F$ is a weighted sum at all channels and original features, which models long-range semantic dependencies.

5. The counterfactual context-aware texture learning network system of claim 4, wherein an element-wise sum operation is performed between f', $f^s$ and $f^c$ to obtain final texture-aware refinement feature maps $F_r$:

$$F_r = f' + f^p + f^c \qquad (6).$$

6. The counterfactual context-aware texture learning network system of claim 5, wherein the CFM comprises:

a coordinate attention module configured to model long-range dependencies; and two multiscale channel attention (MSCA) modules configured to aggregate local and global contexts in two different scale branches.

7. The counterfactual context-aware texture learning network system of claim 6, wherein the coordinate attention module is configured to:

up-sample a high-level feature $F_{hig}$ and perform an element-wise sum operation with a low-level feature $F_{low}$;

use two spatial extents of pooling kernels, (H, 1) and (1, W), to encode results along a horizontal coordinate and a vertical coordinate, respectively, calculate an output of the c-th channel at height h as:

$$z_c^h(h) = \frac{1}{W} \sum_{0 \le i < W} x_c(h, i); \qquad (7)$$

and calculate an output of the c-th channel at width w as:

$$z_c^w(w) = \frac{1}{H} \sum_{0 \le j < H} x_c(j, w) \qquad (8)$$

where $x_c$ are features of the c-th channel.

8. The counterfactual context-aware texture learning network system of claim 7, wherein the coordinate attention module is configured to:

obtain a pair of direction-aware feature maps by (6) and (7);

obtain intermediate feature maps $$f^i \in \mathbb{R}^{\frac{C}{r} \times H},$$

where r is a reduction ratio for controlling a block size, which are configured to extract spatial information in both a horizontal direction and a vertical direction as follows:

$$f^i = \delta(Conv_{1 \times 1}(C(z^h, z^w))) \qquad (9)$$

where C is a concatenation operation, $Conv_{1 \times 1}$ is a shared 1×1 convolutional layer, and δ is a non-linear activation function.

9. The counterfactual context-aware texture learning network system of claim 8, wherein the coordinate attention module is configured to:

split $f^i$ along a spatial dimension into two separate tensors $$f^h \in \mathbb{R}^{\frac{C}{r} \times H}$$

and $$f^w \in \mathbb{R}^{\frac{C}{r} \times W},$$

and utilize a second $Conv_{1 \times 1}$ and sigmoid function to obtain attention weights $g^h$ and $g^w$; and obtain direction-aware and position-sensitive features $F^{dp}$ as follows:

$$F_c^{dp}(i,j) = x_c \times g_c^h(i) \times g_c^w(j) \qquad (10).$$

10. The counterfactual context-aware texture learning network system of claim 9, wherein the high-level feature $F_{hig}$ and the low-level feature $F_{low}$ are input into the two MSCA, and two-level fusion semantics are obtained.

11. The counterfactual context-aware texture learning network system of claim 10, wherein each of the two MSCA are configured to:

obtain local contexts $L(x) \in \mathbb{R}^{C \times H \times W}$ and global contexts $G(x) \in \mathbb{R}^{C \times H \times W}$ as follows:

$$L(F) = B(PWC_2(\delta(B(PWC_1(F))))) \tag{11}$$

$$G(F) = B(PWC_2(\delta(B(PWC_1(GAP(F)))))) \tag{12}$$

where F are input features, $PWC_1$ and $PWC_2$ are point-wise convolutions (PWC), which exploit point-wise channel interactions for each spatial position where a kernel size of $PWC_1$ and $PWC_2$ are $$\frac{C}{r} \times C \times 1 \times 1 \text{ and } \frac{C}{r} \times C \times 1 \times 1$$

respectively, B is a batch normalization layer, $\delta$ is an activation function of the ReLU, and GAP is a global average pooling;

obtain refined multi-scale features F' of MSCA as follows:

$$F' = F \otimes M(F) = F \otimes \sigma(L(F) \oplus G(F)) \tag{13}$$

where $M(F) \in \mathbb{R}^{C \times H \times W}$ are generated attentional weights, $\oplus$ is an element-wise sum operation, $\sigma$ is a sigmoid function, and $\otimes$ is an element-wise multiplication operation; and obtain a fusion of contextual features $F_{fusion}$ as follows:

$$F_{fusion} = (\text{Conv}_{3 \times 3}(C(F_{low}', F^{dp}, F_{hig}'))) \tag{14}$$

where $F_{low}'$ and $F_{hig}'$ are refined multi-scale features from the low-level feature and the high-level feature, respectively, and $F^{dp}$ are the aggregated features of the direction-aware and feature and position-sensitive feature.

12. The counterfactual context-aware texture learning network system of claim 11, wherein the CIM is configured to calculate an intervention output prediction Y according to:

$$Y_{\overline{T}}(X) = P(Y \mid do(T)) = \sum_c P(Y \mid do(\overline{T}, c)) P(c \mid X) \tag{15}$$

where X is the input image, T are hypothetical textures, P is a pixel-image level classifier, and c is the contextual biases to be mitigated from X; and calculate a total effect of learned textures according to:

$$Y_{effect} = Y_T(X) - Y_{\overline{T}}(X) \tag{16}.$$

* * * * *